US009770126B2

(12) United States Patent
Ludeman et al.

(10) Patent No.: US 9,770,126 B2
(45) Date of Patent: Sep. 26, 2017

(54) KNIFE BLOCK WITH INTERCHANGEABLE BLADE RECEIVING CAPS AND METHODS OF ASSEMBLING THE SAME

(71) Applicant: WKI Holding Company, Inc., Rosemont, IL (US)

(72) Inventors: Karl Ludeman, Rosemont, IL (US); Pat Kerulis, Rosemont, IL (US); Tania Aldous, Rosemont, IL (US); Randy Soibel, Rosemont, IL (US)

(73) Assignee: WKI HOLDING COMPANY, INC., Rosemont, IL (US)

( * ) Notice: Subject to any disclaimer, the term of this patent is extended or adjusted under 35 U.S.C. 154(b) by 0 days.

(21) Appl. No.: 14/644,950

(22) Filed: Mar. 11, 2015

(65) Prior Publication Data

US 2015/0257563 A1    Sep. 17, 2015

Related U.S. Application Data

(60) Provisional application No. 61/951,191, filed on Mar. 11, 2014.

(51) Int. Cl.
| A47F 7/00 | (2006.01) |
| A47G 21/14 | (2006.01) |
| A47J 47/16 | (2006.01) |

(52) U.S. Cl.
CPC .............. *A47G 21/14* (2013.01); *A47J 47/16* (2013.01); *Y10T 29/4973* (2015.01); *Y10T 29/49817* (2015.01); *Y10T 29/49826* (2015.01); *Y10T 29/49876* (2015.01)

(58) Field of Classification Search
CPC .... A47B 77/14; A47F 13/08; A47F 2001/103; A47G 21/145; A47G 21/14; A47J 47/16; A47J 45/02; B25H 3/04; Y10T 29/49817; Y10T 29/4973; Y10T 29/49826; Y10T 29/49876
USPC ................... 211/70.7; 248/37.3; 206/553
See application file for complete search history.

(56) References Cited

U.S. PATENT DOCUMENTS

| 1,742,102 | A | * | 12/1929 | Seagles | A22B 3/10 |
| | | | | | 211/69 |
| 2,826,879 | A | * | 3/1958 | Evans | A47G 21/14 |
| | | | | | 451/555 |
| 4,966,339 | A | * | 10/1990 | Lu | A47G 21/14 |
| | | | | | 211/70.7 |
| 5,494,176 | A | * | 2/1996 | Zallo | A47B 77/14 |
| | | | | | 211/70.6 |
| 6,079,108 | A | * | 6/2000 | Lin | B24B 3/54 |
| | | | | | 211/70.7 |
| 6,371,312 | B1 | * | 4/2002 | Tsuchida | A47G 21/14 |
| | | | | | 211/70.7 |
| 6,659,406 | B2 | * | 12/2003 | Tsuchida | A47J 47/16 |
| | | | | | 211/70.7 |

(Continued)

*Primary Examiner* — Jennifer E Novosad
(74) *Attorney, Agent, or Firm* — McDermott Will & Emery LLP

(57) ABSTRACT

An interchangeable knife block that accommodates various numbers and sizes of cutlery utensils. One knife block includes a base, a body having a first end and a second end, wherein the body is coupled to the base at the first end and extends from the base, and a cap removably coupled to the second end of the body and defining one or more slots therein, each slot being configured to receive a portion of a cutlery utensil therein.

14 Claims, 4 Drawing Sheets

(56) References Cited

U.S. PATENT DOCUMENTS

| | | | | |
|---|---|---|---|---|
| 6,854,186 B2* | 2/2005 | Basden | ................. | A47G 21/14 248/37.3 |
| D532,658 S * | 11/2006 | Shen | ............................... | D7/637 |
| 7,267,238 B2* | 9/2007 | Yang | ..................... | A47G 21/14 211/41.2 |
| 7,422,180 B2* | 9/2008 | Tang | ..................... | A47G 21/14 211/70.7 |
| 7,637,803 B2* | 12/2009 | Welch | ................. | B24D 15/084 211/70.7 |
| 2004/0031769 A1* | 2/2004 | Schultz | ................. | A47G 21/14 211/70.7 |
| 2004/0211737 A1* | 10/2004 | Siegel | ................... | A47G 21/14 211/70.7 |
| 2005/0082307 A1* | 4/2005 | Tucker | .................. | A47F 1/065 221/67 |
| 2007/0144987 A1* | 6/2007 | Linzing | ................. | A47G 21/14 211/70.7 |
| 2008/0276465 A1* | 11/2008 | Lafleur | ................. | A47G 21/14 30/298.4 |
| 2009/0106982 A1* | 4/2009 | Kushner | ............... | A47G 21/14 30/142 |
| 2012/0324740 A1* | 12/2012 | Brough | ................. | A47G 21/14 30/298.4 |
| 2015/0107117 A1* | 4/2015 | Bell | ...................... | A47G 21/14 30/143 |
| 2015/0257563 A1* | 9/2015 | Ludeman | ............... | A47J 47/16 211/70.7 |

\* cited by examiner

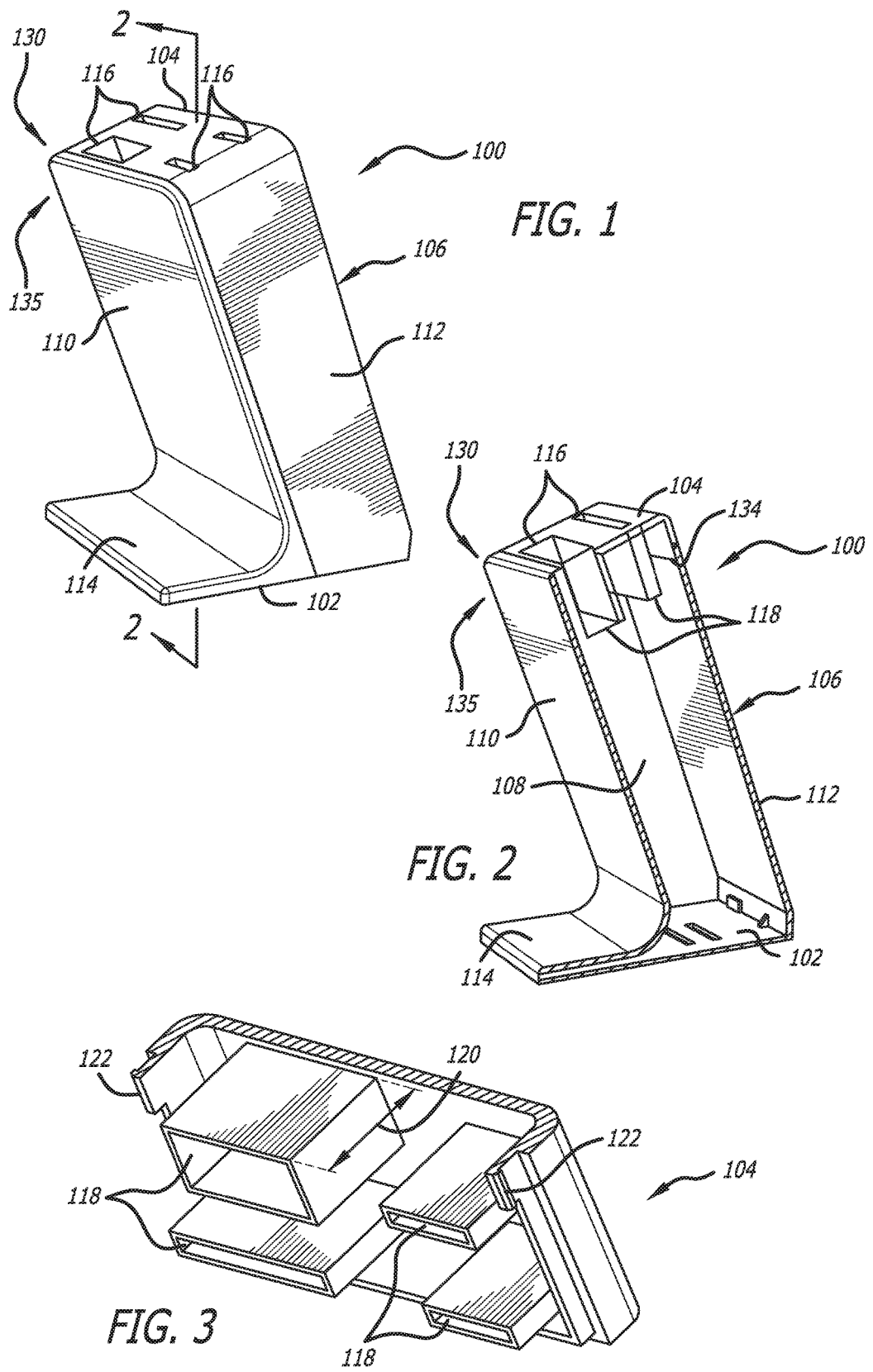

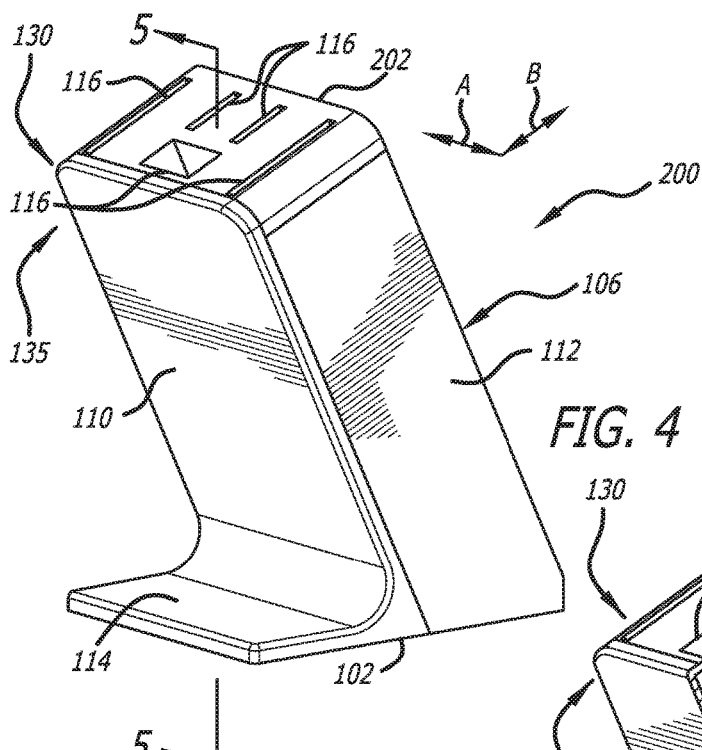
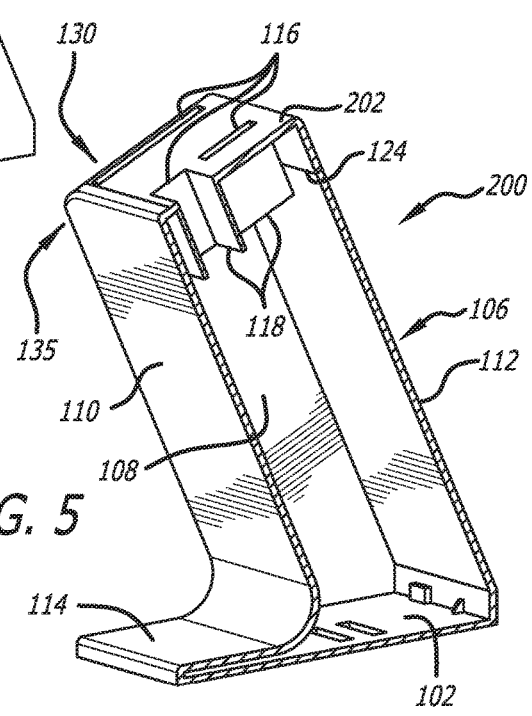
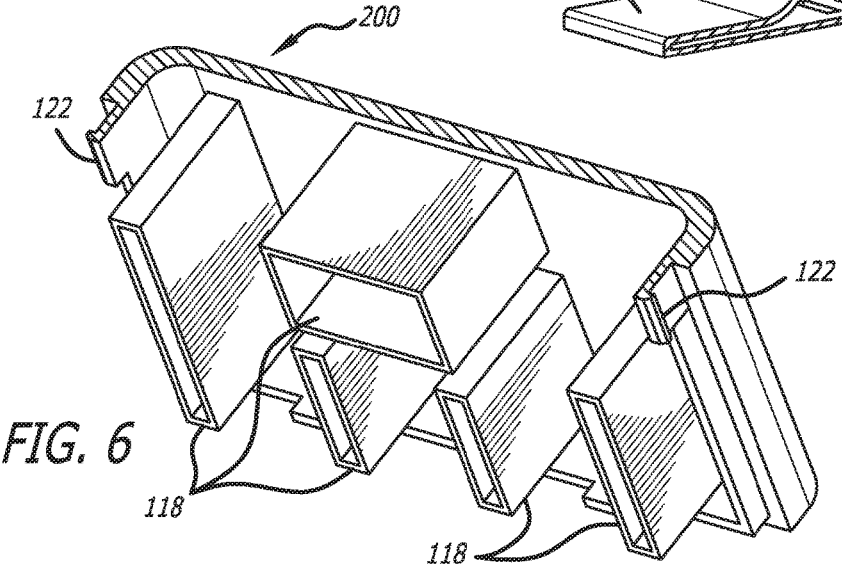

KNIFE BLOCK WITH INTERCHANGEABLE BLADE RECEIVING CAPS AND METHODS OF ASSEMBLING THE SAME

RELATED APPLICATIONS

This application claims priority from, and incorporates the disclosure of U.S. Provisional Application No. 61/951,191, filed Mar. 11, 2014.

BACKGROUND

The present disclosure generally relates to a cutlery and, more particularly, to an interchangeable cutlery block that accommodates various numbers and sizes of cutlery.

Cutlery utensils, such as knives, come in various forms and sizes and are used for numerous applications. Generally, a knife has a blade portion at one end and a handle portion at an opposite end. A tang, which is typically formed integrally with the blade portion, extends into the handle portion and is secured therein by various means.

When not in use, cutlery utensils can be stored or stowed in knife blocks, which can also be provided in various designs, forms, and sizes. Knife blocks generally include one or more slots of uniform or varying widths defined on a receiving end of the knife block. The slots are adapted to receive and seat the cutlery utensils such that at least a portion of each blade is extended into and otherwise disposed within the interior of the knife block. Some knife blocks are made of wood and the slots are defined by strategically removing slot-shaped portions of the wood with a table saw or other machine from the receiving end. Other types of knife blocks include a block shell that is filled with elongate plastic rods that allow for a universal slot for various sizes of knives.

Traditionally, manufacturing knife blocks of varying configurations and slot sizes can be challenging and costly. It is often necessary to design and use different overall structural knife block designs to accommodate a myriad of configurations. As such, it is often necessary to invest in tooling for the entirety of the knife block in order to meet the challenge of manufacturing the various configurations.

The present invention is provided to solve the problems discussed above and other problems, and to provide advantages and aspects not provided by knife blocks. A full discussion of the present invention is deferred to the following detailed description, which proceeds with reference to the accompanying drawings

SUMMARY

According to one embodiment, a knife block is disclosed. The knife block includes a base, a body and a cap. The body has a first end and a second end. The body is coupled to the base at the first end and extends from the base. The cap is removably coupled to the second end of the body and defines one or more slots therein. Each slot is configured to receive a portion of a cutlery utensil therein.

A method of assembling a knife block with an interchangeable blade receiving cap is also disclosed. According to the method, a first cap is extended at least partially into an end of a body of a knife block and removably securing the first cap within the end of the body.

Other features of the invention will be apparent from the following specification taken in conjunction with the following drawings.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 1 is an isometric view of an exemplary knife block, according to one or more embodiments.

FIG. 2 is a cross-sectional view taken along the line 2-2 of the knife block show in FIG. 1.

FIG. 3 is a cross-sectional view of a removable cap used in connection with the knife block shown in FIG. 1.

FIG. 4 is an isometric view of an embodiment of another exemplary knife block, according to one or more embodiments.

FIG. 5 is a cross-sectional view taken along the line 5-5 of the knife block shown in FIG. 4.

FIG. 6 is a cross-sectional view of a removable cap used in connection with the knife block shown in FIG. 4.

Figure 7:
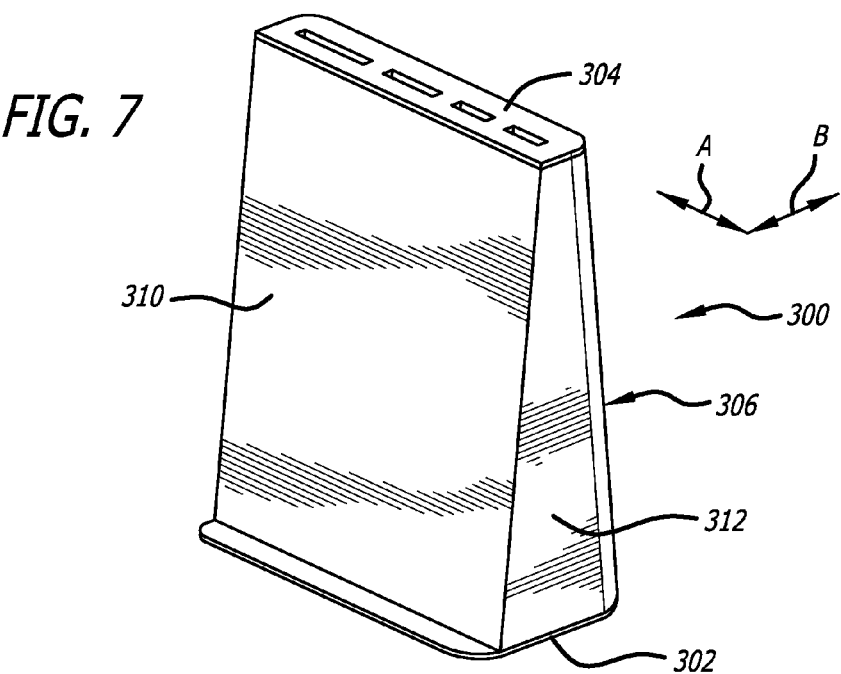
FIG. 7 is an isometric view of an embodiment of another exemplary knife block, according to one or more embodiments.

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

DETAILED DESCRIPTION

The present disclosure generally relates to cutlery and, more particularly, to an interchangeable knife block that accommodates various numbers and sizes of cutlery.

The embodiments of the present disclosure describe a knife block that includes a cap attached and arranged at a receiving end of the knife block. The cap includes one or more slots that may exhibit varying sizes, numbers, and/or configurations. The cap may be configured to be removed from the knife block by a user or manufacturer and interchanged with a second cap having one or more slots that exhibit different sizes, numbers, and/or configurations than the first cap. As a result, a user or manufacturer may be able to selectively choose the cap for the knife block to accommodate a desired number and/or sizing of cutlery utensils. As can be appreciated, this will allow for multiple knives and knife counts to be used in the same knife block assembly by changing only one component or part of the assembly.

Referring to FIGS. 1-3, illustrated is an embodiment of an exemplary knife block 100, according to one or more embodiments. More particularly, FIG. 1 depicts an isometric view of the knife block 100, FIG. 2 depicts a cross-sectional isometric view of the knife block 100, and FIG. 3 depicts an isometric, bottom view of the receiving end of the knife block 100. As illustrated, the knife block 100 includes a base 102, a cap 104, and a body 106 that generally extends between the base 102 and the cap 104. Each of the base 102, the cap 104, and the body 106 may be made of a variety of materials including, but not limited to, plastics, metals, composites (e.g., fiberglass, carbon fiber, etc.), ceramics, wood, and any combination thereof. Those skilled in the art will readily appreciate, however, that the base 102, the cap 104, and the body 106 may each be made of any rigid material, without departing from the scope of the disclosure. It should also be understood that one or more of the base 102, the cap 104, and the body 106 may each be made of a flexible or elastic material such as, for example, a thermoplastic elastomer or silicone, without departing from the scope of the disclosure.

The base 102 provides a surface or location where the knife block 100 may be able rest upon an opposing planar surface (i.e., a table, countertop, etc.). The base 102 is coupled to the body 106 via a variety of fastening techniques. For example, the base 102 may be coupled to the body 106 using a snap-fit engagement, one or more mechanical fasteners, an interference fit, adhesives, sonic welding, melding, and any combination thereof.

The body 106 generally extends vertically from the base 102. In some embodiments, the body 106 may extend substantially orthogonal to the planar surface of the base 102. In other embodiments, however, as illustrated, the body 106 may extend from the base 102 at an angle offset from orthogonal. Extending at an angle offset from orthogonal may prove advantageous in placing the receiving end of the knife block 100 such that it is ergonomically accessible by a user. As a result, this may facilitate easier access to knives (not shown) that can be stowed within the knife block 100, but also arranges the receiving end so that a user can more easily locate slots defined therein to insert knife blades.

The body 106 defines or otherwise provides an interior 108 (FIG. 2). The base 102 generally encloses the interior 108 at the bottom end of the knife block 100, and the cap 104 generally encloses the interior 108 at the receiving end. As described herein, the blade(s) of one or more knives may be extended through the cap 104 and into the interior 108 in order to properly store or stow the knives in the knife block 100. Accordingly, in at least one embodiment, the interior 108 may be generally vacuous. In other embodiments, however, the interior 108 may be at least partially filled with a fluid, without departing from the scope of the disclosure. In still other embodiments, the interior 108 may be partially filled with a solid or semi-solid material.

In some embodiments, the body 106 may be made of a single monolithic component that defines the sides of the knife block 100 extending between the base 102 and the cap 104. In other embodiments, however, the body 106 may be made of multiple components. As illustrated, for example, the body 106 may include a faceplate 110 and a shroud 112 operatively coupled to the faceplate 110. The faceplate 110 may be coupled or otherwise secured to the shroud 112 using a snap-fit engagement, one or more mechanical fasteners, an interference fit, adhesives, sonic welding, melding, and any combination thereof. The faceplate 110 may include a pedestal 114 that transitions from the faceplate 110 and extends substantially horizontal and otherwise parallel with the base 102. The pedestal 114 may be configured to be coupled to the base 102 in order to provide stability to the knife block 100 in its angled configuration.

The cap 104 may be characterized as the receiving end of the knife block 100. To this end, the cap 104 may include or otherwise define one or more slots 116 (four shown in FIG. 1). Each slot 116 may extend through the cap 104 and may be configured to receive the blade of a corresponding knife to be stowed in the knife block 100. Accordingly, the shape and width of each slot 116 may vary one from another to accommodate various sizes and shapes of knives or other cutlery utensils (e.g., knife sharpening rods).

One or more of the slots 116 may have a corresponding blade sleeve 118 that extends therefrom into the interior 108 of the knife block 100. According to one embodiment depicted in FIGS. 2 and 3, the blade sleeves 118 may exhibit substantially the same size and width as its corresponding slot 116 and extend a short distance into the interior 108. It will be understood, however, that the width of the collar may vary along its length without departing from the present disclosure. As can be appreciated, the blade sleeves 118 may prove advantageous in providing elongate guides for knife blades extended through the slots 116 and into the interior 108. More particularly, each blade sleeve 118 may help to align knife blades as they are inserted into the knife block 100 so that adjacent blades remain isolated from each other and otherwise do not mar or damage one another.

In some embodiments, the blade sleeve 118 may be omitted from one or more (or all) of the slots 116. Moreover, while depicted in FIGS. 2 and 3 as extending a certain longitudinal distance into the interior 108, and otherwise exhibiting a length 120 (FIG. 3), those skilled in the art will readily appreciate that the blade sleeves 118 may extend into the interior 108 to any distance or length 120, without departing from the scope of the disclosure. For instance, in at least one embodiment, one or more of the blade sleeves 118 may exhibit a length 120 that extends all the way to the base 102. Furthermore, while the length 120 of each blade sleeve 118 is depicted in FIGS. 2 and 3 as being substantially uniform (i.e., of approximately the same length), it will further be appreciated that the length 120 of each blade sleeve 118 may be unique. In other embodiments, the length of two or more of the blade sleeves 118 may be substantially the same but dissimilar to the length of the remaining blade sleeves 118.

According to the present disclosure, the cap 104 may be an interchangeable component of the knife block 100. More particularly, the cap 104 may be designed such that it can be replaced by a user or manufacturer with a different cap that provides a different number or configuration of slots 116. Accordingly, an appropriately designed cap 104 may be selected by a user or manufacturer to be installed in the knife block 100 in order to accommodate varying numbers and sizes of knife blades.

In at least one embodiment, as illustrated, the cap 104 may be secured to the body 106 via a snap-fit engagement. More particularly, the cap 104 may be configured to be inserted a short distance into the interior 108 and may include one or more lips 122 (FIG. 3). The lips 122 may extend from the cap 104 and may be configured to engage a shoulder 124 (FIG. 2) defined on at least one of the inner surfaces of the body 106. To assemble the cap 104 to the body 106, the cap 104 may be extended into the interior 108 of the body 106, which results in the lips 122 flexing inward. As the cap 104 progresses into the interior 108, the lips 122 may eventually locate the shoulder 124 and flex outward and into engagement therewith, thereby forming a snap-fit engagement. The snap-fit engagement may prove useful in allowing a user to reverse the assembly process to remove the cap 104 such that it can be interchanged with a new (differently configured) cap that exhibits a different configuration or design of the slots 116.

While described herein as a snap-fit engagement, the cap 104 may be removably attached to the body 106 via a variety of other means, without departing from the scope of the disclosure. For example, in some embodiments, the cap 104 may be mechanically fastened to the body 106, such as through the use of one or more threaded fasteners. In other embodiments, the cap 104 may be secured to the body 106 via an interference fit, where the outer dimensions of the cap 104 are slightly smaller than the inner dimensions of the body 106. In such embodiments, if desired, the user or manufacturer may be able to overcome the interference fit to remove and replace the cap 104 with a new cap that exhibits a different configuration or design of the slots 116. It should be understood that in some embodiments the cap 104 can be permanently affixed to the body 306 once the knife block is assembled to its final form.

Referring now to FIGS. 4-6, with continued reference to FIGS. 1-3, illustrated is an embodiment of another exemplary knife block 200, according to one or more embodiments. The knife block 200 may be substantially similar to the knife block 100 of FIGS. 1-3 and therefore may be best understood with reference thereto, where like numerals represent like elements not described again in detail. More particularly, the knife block 200 includes the base 102 and the body 106, as generally described above. The knife block 200, however, may further include a cap 202 that is different from the cap 104 of FIGS. 1-3, but nonetheless able to be removably attached to the body 106.

Again, the cap 202 may be characterized as the receiving end of the knife block 200 and includes or otherwise defines one or more slots 116 (five shown in FIG. 4) therein. The shape and width of each slot 116 in the cap 202 may vary one from another to accommodate various sizes and shapes of knives or other cutlery utensils (e.g., knife sharpening rods). One or more of the sizes, shapes, and/or disposition of the slots 116 in the cap 202 may be different than the slots 116 in the cap 104 of FIGS. 1-3. For instance, the slots 116 in the cap 104 of FIGS. 1-3 are depicted as being disposed or defined laterally A (FIG. 4) with respect to the cap 104. The slots 116 in the cap 202, however, are depicted as being disposed or defined longitudinally B (FIG. 4) with respect to the cap 202. Those skilled in the art will readily appreciate, however, that the slots 116 can be defined laterally A or longitudinally B, or a combination of both, in either cap 104, 202, without departing from the scope of the disclosure. In other embodiments, one or more slots 116 defined in either cap 104, 202 may be disposed at an angle offset from laterally A or longitudinally B, without departing from the scope of the disclosure.

According to the present disclosure, the cap 202 is interchangeable with the cap 104 of FIGS. 1-3, and/or various other caps having differing designs and configurations. As can be seen in FIGS. 1, 2, 4 and 5, the cap 104 and the cap 202 are each removably coupled to a second end 135 of the body at a coupling location 130. Further, in some implementations, the cap 104 and the cap 202 are each removably coupled to the second end 135 of the body at the coupling location 130 interchangeably with the other of the cap 104 and the cap 202. As with the cap 104, the cap 202 is removably attached to the body 106 such that a user or manufacturer is able to remove the cap 202 and replace it with a different cap (e.g., the cap 104). Accordingly, either cap 104, 202 may be interchangeably used in either knife block 100, 200, without departing from the scope of the disclosure.

Similar to the cap 104, in at least one embodiment, the cap 202 may be secured to the body 106 via a snap-fit engagement. More particularly, the cap 202 may be configured to be inserted a short distance into the interior 108 and may include one or more lips 122 (FIG. 6). In such an embodiment, the lips 122 extend from the cap 202 and are configured to engage a shoulder 124 (FIG. 5) defined on at least one of the inner surfaces of the body 106. To assemble the cap 202 to the body 106, the cap 202 may be extended into the interior 108 of the body 106, which results in the lips 122 flexing inward. As the cap 202 progresses into the interior 108, the lips 122 will eventually locate the shoulder 124 and flex outward and into engagement therewith, and thereby forming a snap-fit engagement. The snap-fit engagement may prove useful in allowing a user or manufacturer to reverse the assembly process to remove the cap 202 and subsequently secure a new (differently configured) cap to the body 106.

While depicted in FIGS. 4-6 as a snap-fit engagement, the cap 202 may equally be removably attached to the body 106 via a variety of other means including, but not limited to, mechanically fastening the cap 202 to the body 106, an interference fit between the cap 202 to the body 106, or a combination thereof. In such embodiments, if desired, the user or manufacturer can remove and replace the cap 202 with a new cap that exhibits a different configuration or design of the slots 116. It should be understood that in some embodiments the cap 202 can be permanently affixed to the body 106 once the knife block is assembled to its final form.

Figure 8:
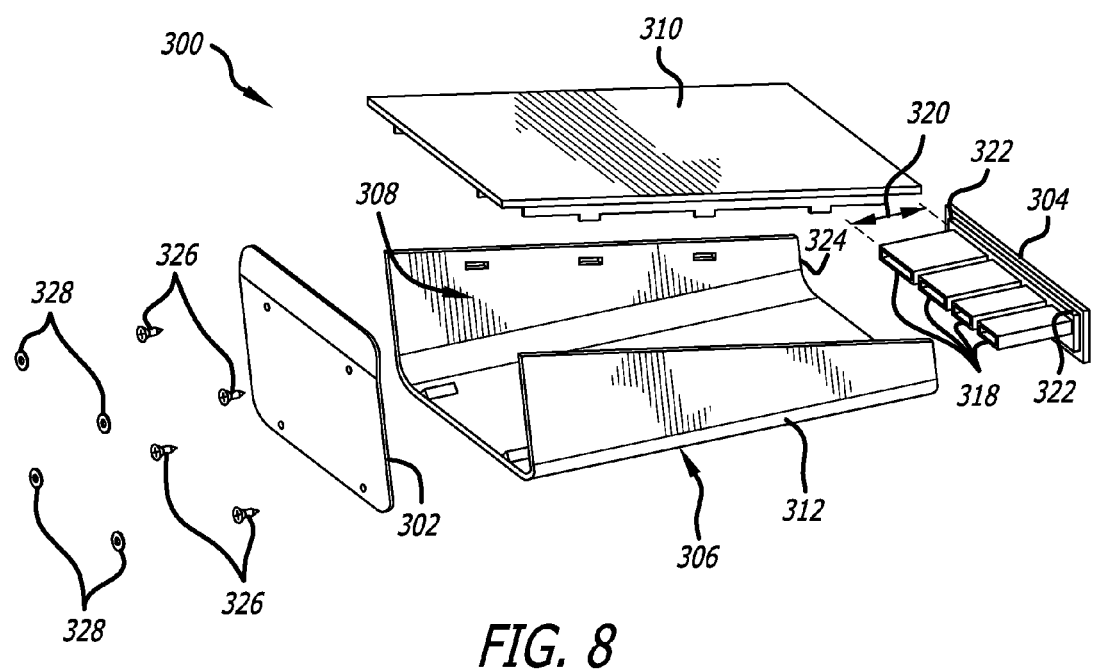
FIG. 8 is an exploded view of the knife block shown in FIG. 7.

Referring now to FIGS. 7 and 8, with continued reference to FIGS. 1-3 and 4-6, illustrated is an embodiment of another exemplary knife block 300, according to one or more embodiments. More particularly, FIG. 4 depicts an isometric view of the knife block 300 and FIG. 8 depicts an exploded view of the knife block 300. The knife block 300 may be similar in some respects to the knife blocks 100 and 200 and therefore will be best understood with reference thereto, where like numerals will reference like elements not described again.

As illustrated, the knife block 300 may include a base 302, a cap 304, and a body 306 that generally extends between the base 302 and the cap 304. Each of the base 302, the cap 304, and the body 306 may be made of a variety of materials including, but not limited to, plastics, metals, composites (e.g., fiberglass, carbon fiber, etc.), ceramics, wood, and any combination thereof. Those skilled in the art will readily appreciate, however, that the base 302, the cap 304, and the body 306 may each be made of any rigid material, without departing from the scope of the disclosure.

The base 302 may provide a surface or location where the knife block 300 may be able rest upon an opposing planar surface (i.e., a table, countertop, etc.). The base 302 may be coupled to the body 306 via a variety of fastening techniques. For example, the base 302 may be coupled to the body 306 using a snap-fit engagement, mechanical fasteners 326 (with or without washers 328), an interference fit, adhesives, sonic welding, melding, and any combination thereof.

The body 306 generally extends vertically from the base 302, and the body 306 may define or otherwise provide an interior 308 (FIG. 8). The base 302 generally encloses the interior 308 at the bottom end of the knife block 300, and the cap 304 generally encloses the interior 308 at the receiving end. As described herein, the blade(s) of one or more knives may be extended through the cap 304 and into the interior 308 in order to properly store or stow the knives in the knife block 300.

In some embodiments, the body 306 is made of a single monolithic component that defines the sides of the knife block 300 extending between the base 302 and the cap 304. In other embodiments, however, the body 306 is made of multiple components. As illustrated, for example, the body 306 may include a faceplate 310 and a shroud 312 operatively coupled to the faceplate 310. The faceplate 310 may be coupled or otherwise secured to the shroud 312 using a snap-fit engagement, mechanical fasteners, an interference fit, adhesives, sonic welding, melding, and any combination thereof.

The cap 304 is characterized as the receiving end of the knife block 300 and includes or otherwise defines one or more slots 316 (four shown in FIG. 7). As depicted, the slots 316 are defined laterally A within the cap 304, similar to the slots 116 in FIGS. 1 and 2. In other embodiments, however, the slots 316 may be defined longitudinally B within the cap 304, similar to the slots 116 in FIGS. 4 and 5, or a combination of laterally A and longitudinally B. Each slot 316 may extend through the cap 304 and may be configured to receive the blade of a corresponding knife to be stowed in the knife block 300. Accordingly, the shape and width of each slot 316 may vary one from another to accommodate various sizes and shapes of knives or other cutlery utensils (e.g., knife sharpening rods).

Referring specifically to FIG. 8, one or more of the slots 316 may have a corresponding blade sleeve 318 that extends therefrom into the interior 308 of the knife block 300. The blade sleeves 318 exhibit substantially the same size and width as its corresponding slot 316 and extends a short distance into the interior 308. As can be appreciated, the blade sleeves 318 may prove advantageous in providing elongate guides for knife blades extended through the slots 316 and into the interior 308. More particularly, each blade sleeve 318 may help to align knife blades into the knife block 300 so that adjacent blades remain isolated from each other and otherwise do not mar or damage one another.

In some embodiments, the blade sleeve 318 may be omitted from one or more (or all) of the slots 316. Moreover, while depicted as extending a certain longitudinal distance into the interior 308, and otherwise exhibiting a particular length 320, those skilled in the art will readily appreciate that the blade sleeves 318 can extend into the interior 308 to any distance or length 320, without departing from the scope of the disclosure. For instance, in at least one embodiment, one or more of the blade sleeves 318 may exhibit a length that extends all the way to the base 302. Furthermore, while the length 320 of each blade sleeve 318 is depicted as being substantially uniform (i.e., of approximately the same length), it will further be appreciated that the length 320 of each blade sleeve 318 may be unique. In other embodiments, the length of two or more of the blade sleeves 318 may be substantially the same but dissimilar to the length of the remaining blade sleeves 318.

According to the present disclosure, the cap 304 is an interchangeable component of the knife block 300. More particularly, the cap 304 is designed such that it can be replaced by a manufacturer or user and otherwise interchanged with a differently designed cap that provides a different number, configuration, or sizes of slots 316. Accordingly, the cap 304 is removably attached to the body 306 such that it can be removed and replaced with a different cap (not shown).

In at least one embodiment, as illustrated, the cap 304 may be secured to the body 306 via a snap-fit engagement. More particularly, the cap 304 may be configured to be inserted a short distance into the interior 308 and may include one or more lips 322 (FIG. 8). The lips 322 extends from the cap 304 and may be configured to engage a shoulder 324 (FIG. 8) defined on at least one of the inner surfaces of the body 306. To assemble the cap 304 to the body 306, the cap 304 may be extended into the interior 308 of the body 306, which results in the lips 322 flexing inward. As the cap 304 progresses into the interior 308, the lips 322 will eventually locate the shoulder 324 and flex outward and into engagement therewith, and thereby forming a snap-fit engagement. The snap-fit engagement may prove useful in allowing a user or manufacturer to reverse the assembly process to remove the cap 304 and subsequently secure a new (differently configured) cap to the body 306.

While described herein as a snap-fit engagement, the cap 304 may be removably attached to the body 306 via a variety of other means, without departing from the scope of the disclosure. For example, in some embodiments, the cap 304 may be mechanically fastened to the body 306, such as through the use of one or more threaded fasteners. In other embodiments, the cap 304 may be secured to the body 306 via an interference fit, where the outer dimensions of the cap 304 are slightly smaller than the inner dimensions of the body 306. In such embodiments, if desired, the user or manufacturer can remove and replace the cap 304 with a new cap that exhibits a different configuration or design of the slots 316. It should be understood that in some embodiments the cap 304 can be permanently affixed to the body 306 once the knife block is assembled to its final form.

Figure 9:
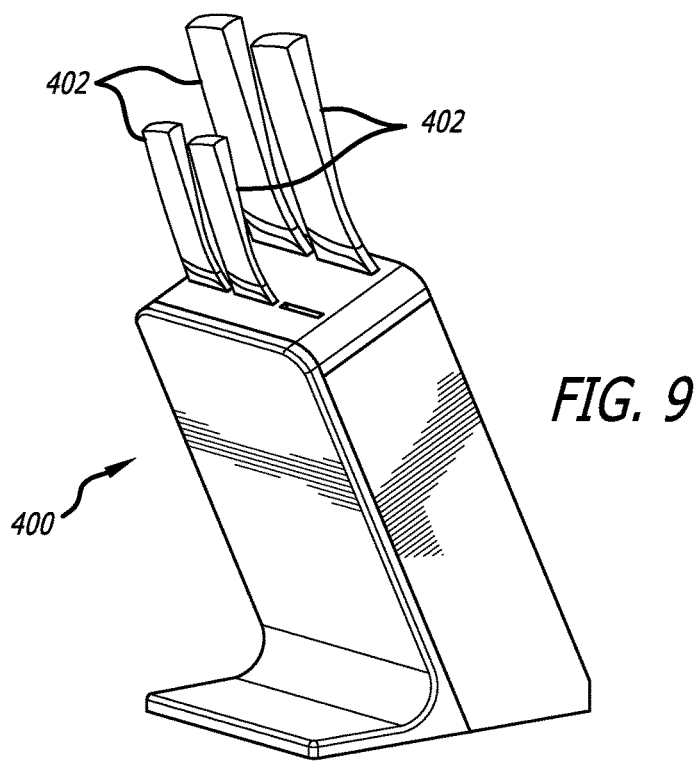
FIG. 9 is an isometric view of an exemplary knife block in conjunction with multiple knives, according to embodiments of the present disclosure.
Figure 10:
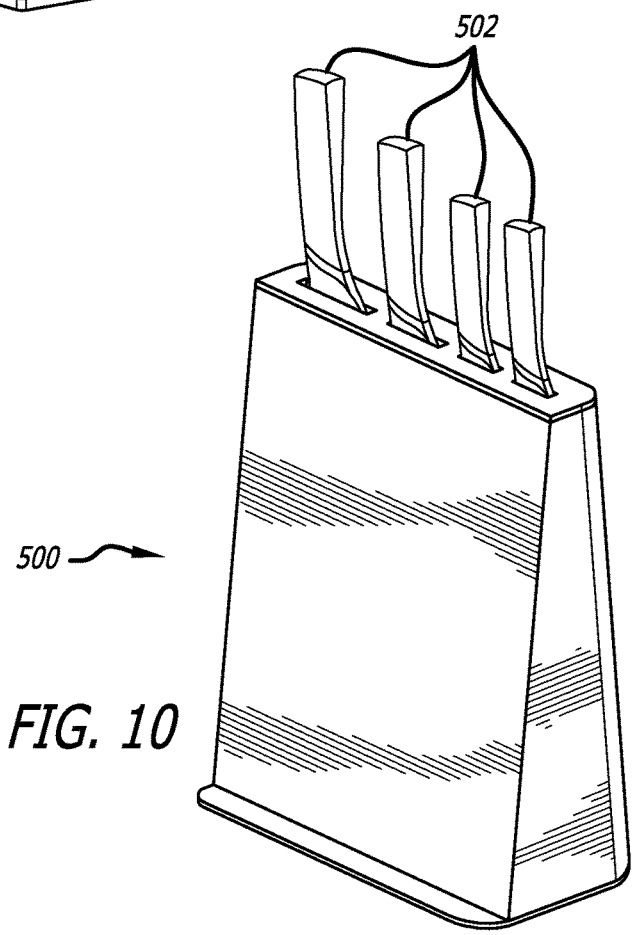
FIG. 10 is an isometric view of another exemplary knife block in conjunction with multiple knives, according to embodiments of the present disclosure.

Referring now to FIGS. 9 and 10, illustrated are two exemplary knife blocks 400 and 500, respectively, according to embodiments of the present disclosure. In the illustrated embodiments, multiple knives 402 and 502 are depicted as being stowed within the corresponding knife blocks 400 and 500. The knife block 400 may be similar in some respects to the knife block 100 of FIGS. 1-3, and the knife block 400 may be similar in some respects to the knife block 100 of FIGS. 1-3.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A knife block, comprising:
   a base;
   a body having a first end and a second end, wherein the body is coupled to the base at the first end and extends from the base;
   a first cap removably coupled to the second end of the body at a coupling location and defining one or more slots therein, each slot being configured to receive a portion of a cutlery utensil therein and;
   a second cap, distinct from the first cap, defining one or more second slots therein, each second slot being configured to receive a portion of a cutlery utensil therein, the second cap being removably coupled to the second end of the body at the coupling location interchangeably with the first cap being removably coupled to the second end of the body at the coupling location.

2. The knife block of claim 1, wherein the body extends orthogonally from the base.

3. The knife block of claim 1, wherein the body extends at an angle from orthogonal from the base.

4. The knife block of claim 1, wherein the body further comprises:
   a faceplate; and
   a shroud operatively coupled to the faceplate.

5. The knife block of claim 1, further comprising one or more blade sleeves extending from the one or more first slots and the one or more second slots and into an interior of the body.

6. The knife block of claim 1, wherein the first cap is removably coupled to the second end of the body via a snap-fit engagement.

7. The knife block of claim 1, wherein the first cap is removably coupled to the second end of the body via an interference fit.

8. The knife block of claim 1, wherein the one or more first slots are defined laterally or longitudinally with respect to the first cap and the one or more second slots are defined laterally or longitudinally with respect to the second cap.

9. A method of assembling a knife block with an interchangeable blade receiving cap, the method comprising:
   extending a first cap at least partially into an end of a body of a knife block at a coupling location, the first cap having one or more first slots defined therein for the receipt of a portion of a cutlery utensil;
   removably securing the first cap within the end of the body at the coupling location;
   removing the first cap from the first end of the body;
   extending a second cap, distinct from the first cap, at least partially into the end of the body at the coupling location, the second cap having one or more second slots defined therein for the receipt of a portion of a cutlery utensil; and
   removably securing the second cap within the end of the body, the second cap being removably secured to the end of the body at the coupling location interchangeably with the first cap being removably secured to the end of the body at the coupling location.

10. The method of claim 9, wherein the body includes a faceplate and a shroud, and wherein extending the first cap at least partially into the body is preceded by operatively coupling the shroud to the faceplate.

11. The method of claim 10, further comprising coupling a base to a second end of the body opposing the end of the body.

12. The method of claim 9, wherein the step of removably securing the first cap within the end of the body comprises:
   inserting the first cap a distance into an interior of the body and thereby flexing inward one or more lips defined on the first cap;
   advancing the first cap into the interior such that the one or more lips locate a shoulder defined on an inner surface of the body; and
   forming a snap-fit engagement as the one or more lips flex outward upon locating the shoulder.

13. The method of claim 12, further comprising:
   releasing the one or more lips from engagement with the shoulder; and
   removing the first cap from the interior of the body.

14. The method of claim 9, wherein the step of removably securing the first cap within the end of the body comprises generating an interference fit between the first cap and the end of the body.

* * * * *